US007461424B2

(12) United States Patent
Lindell

(10) Patent No.: US 7,461,424 B2
(45) Date of Patent: Dec. 9, 2008

(54) METHOD AND APPARATUS FOR A PILLOW INCLUDING FOAM PIECES OF VARIOUS SIZES

(75) Inventor: Michael Lindell, Carver, MN (US)

(73) Assignee: Wayne Belisle, Mendota Heights, MN (US)

(*) Notice: Subject to any disclaimer, the term of this patent is extended or adjusted under 35 U.S.C. 154(b) by 394 days.

(21) Appl. No.: 11/287,512

(22) Filed: Nov. 23, 2005

(65) Prior Publication Data

US 2007/0113347 A1 May 24, 2007

(51) Int. Cl.
*A47G 9/00* (2006.01)
*A47C 27/14* (2006.01)
*B32B 3/26* (2006.01)

(52) U.S. Cl. ................................ 5/655.9; 5/636; 5/690; 5/953; 428/304.4; 428/315.7

(58) Field of Classification Search ............. 5/636–640, 5/645, 655.9, 740, 953, 690; 428/304.4, 428/315.7

See application file for complete search history.

(56) References Cited

U.S. PATENT DOCUMENTS 2,298,218 A * 10/1942 Madson ...................... 5/655.4
3,667,074 A 6/1972 Emery
3,900,648 A 8/1975 Smith
4,021,871 A 5/1977 Wortman
4,060,863 A 12/1977 Craig
4,109,332 A * 8/1978 Luck ............................. 5/636
4,432,110 A * 2/1984 Sutton ........................ 5/655.9
4,606,088 A 8/1986 Michaelsen et al.
4,862,539 A * 9/1989 Bokich .......................... 5/691
4,956,886 A 9/1990 Sarkozi
4,959,880 A 10/1990 Tesch
5,732,426 A 3/1998 Furuya et al.
6,732,391 B2 * 5/2004 George, II ...................... 5/652
6,928,678 B1 8/2005 Chang
7,255,917 B2 * 8/2007 Rochlin et al. ........... 428/304.4
2001/0042271 A1 11/2001 Pearce
2003/0028969 A1 2/2003 Rossdeutscher
2003/0046765 A1 3/2003 Brown
2004/0019972 A1 2/2004 Schecter et al.
2005/0076442 A1 4/2005 Wassilefky
2005/0076443 A1 4/2005 Kruger, Jr. et al.
2005/0177945 A1 8/2005 Chang
2006/0248651 A1 * 11/2006 Lazakis et al. ................. 5/636

* cited by examiner

*Primary Examiner*—Alexander Grosz
(74) *Attorney, Agent, or Firm*—Schwegman, Lundberg & Woessner, P.A.

(57) ABSTRACT

The present subject matter includes a pillow having a variety of foam pieces, including foam pieces of different sizes and irregular shapes.

20 Claims, 2 Drawing Sheets

METHOD AND APPARATUS FOR A PILLOW INCLUDING FOAM PIECES OF VARIOUS SIZES

TECHNICAL FIELD

The present subject matter relates to pillows, and more specifically to pillows including foam pieces of various sizes.

BACKGROUND

Pillow users have reported that existing pillow designs have insufficient cushioning. In response to these needs, many designs have been tried. Some designs include solid blocks of form-fitting material. Additional designs include various natural and artificial fillings. Workers have tried these designs in hopes of achieving improved cushioning characteristics and user comfort. But comfort and quality are difficult to perfect, and users still communicate a need for improvements.

To answer their needs, materials which are more compressible have been used. Materials which have a tendency to settle into a comfortable shape have also been used. In hopes of realizing some of these goals, pillows having foam materials have been used. But users have still complained that materials do not combine the right combination of cushion, conformability, and shape adjustability. What is needed is a pillow which offers superior cushioning, form fit, and overall shape. Solutions should be inexpensive, and should be compatible with efficient production techniques.

SUMMARY

The above-mentioned problems and others not expressly discussed herein are addressed by the present subject matter and will be understood by reading and studying this specification.

One embodiment of the present subject matter includes a case; a first plurality of foam pieces; a second plurality of foam pieces which are larger on average than the first plurality of foam pieces; and a third plurality of foam pieces, which are larger on average than the second plurality of foam pieces, wherein the first, second, and third pluralities are disposed in the case in a mix, with the first plurality of foam pieces representing approximately 20 to 30 percent of the foam disposed in the case, and with the remaining foam disposed in the case including the second plurality and the third plurality in an approximately equal proportion.

Another embodiment of the present subject matter includes a case; and a plurality of polyurethane foam pieces disposed in the case; wherein the plurality of a foam pieces has a density of from about 1.8 pounds per cubic foot to about 1.9 pounds per cubic foot, and an indent force deflection at 25% of from about 27 to about 35.

One embodiment of the present subject matter includes a cushion including a case containing a filling of foam pieces, the filling made by the process of feeding a foam block into a cutting machine; cutting the foam block with the cutting machine; collecting a first plurality of foam pieces with an approximately 0.375 inch to an approximately 0.625 inch grid; collecting a second plurality of foam pieces with an approximately 0.75 inch to an approximately 1.25 inch grid; collecting a third plurality of foam pieces with an approximately 2.0 inch to an approximately 2.5 inch grid; mixing the first, second, and third pluralities into the filling; and dispensing the filling into the case.

Options include a lustrous printing on the exterior of the case, in some embodiments having a pattern of spots. Some embodiments are hypoallergenic. Some embodiments include foam pieces which have an average thickness of 46 millimeters. Some embodiments include foam pieces which have an average thickness of approximately 27 millimeters. Some embodiments include foam pieces which have a thickness which ranges from the thickness of one cell to approximately ten millimeters.

Various foams are optionally used. Some foams have a compressive set percentage of approximately 10 percent. Some have a tensile strength of approximately 10 pounds per square inch. Some have a tear strength of approximately 1 pound per linear inch. Some have an elongation percentage of 100 percent. Some include polyurethane. Some foams are open celled.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their legal equivalents.

DETAILED DESCRIPTION

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. It will be apparent, however, to one skilled in the art that the various embodiments may be practiced without some of these specific details. References to "an", "one", or "various" embodiments in this disclosure are not necessarily to the same embodiment, and such references may contemplate more than one embodiment. The following detailed description is, therefore, not to be taken in a limiting sense, and the scope is defined only by the appended claims, along with the full scope of legal equivalents to which such claims are entitled.

The present subject matter addresses the needs of pillow users who complain that foam pillows could offer improved cushion, and could better resist the tendency to settle into uncomfortable shapes. To address these needs, the present subject matter combines, in one embodiment, three groups of foam pieces, each having a selected average size and a selected standard deviation of average size. Additionally, the present subject matter, in various embodiments, offers novel pillow materials. The present subject matter was developed through a trial-and-error process which tested hundreds of combinations of foam material and foam configurations. Various embodiments of the present subject matter include foam specifically selected for its superior properties in delivering comfort.

The present subject matter, in various embodiments, includes foam pieces of various sizes. The foam pieces include sizes selected for their interrelationship. For example, some embodiments use a combination of small, medium, and large foam pieces sizes. The combination of sizes, in various embodiments, is used such that interstices formed by, for example, large foam pieces, are filled with medium and small foam pieces. The standard deviation of sizes for each foam size group is selected to achieve a beneficial interrelationship.

Figure 1:
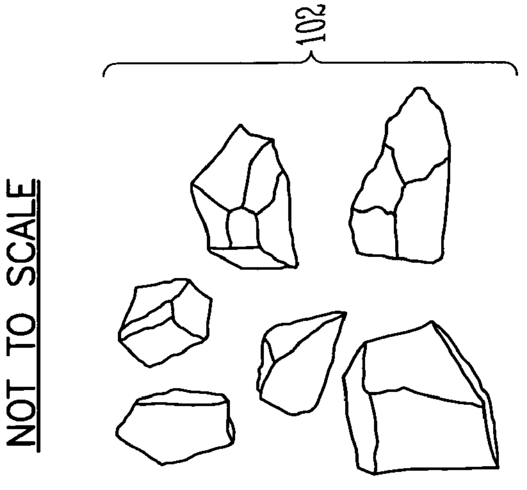
FIG. 1 shows an assortment of large foam pieces 102, according to one embodiment of the present subject matter.
Figure 2:
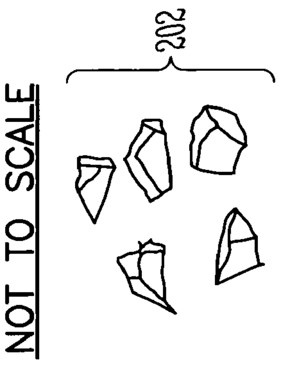
FIG. 2 shows an assortment of medium foam pieces 202, according to one embodiment of the present subject matter.
Figure 3:
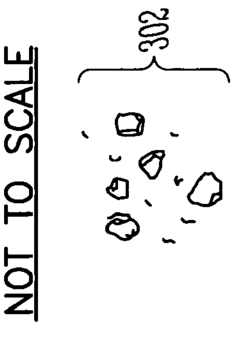
FIG. 3 shows an assortment of small foam pieces 302, according to one embodiment of the present subject matter.
Figure 4:
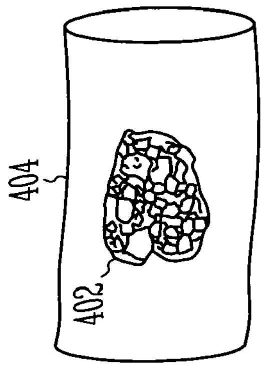
FIG. 4 shows a pillow having a filling including small foam pieces, medium foam pieces, and large foam pieces, according to one embodiment of the present subject matter.

FIG. 1 shows an assortment of large foam pieces 102, according to one embodiment of the present subject matter. In various embodiments, the foam pieces are selected for their average size, and the selected group adheres to a selected standard deviation of size. FIG. 2 shows an assortment of medium foam pieces 202, according to one embodiment of the present subject matter. In various embodiments, the foam pieces are selected for their average size, and the selected group adheres to a selected standard deviation of size. FIG. 3 shows an assortment of small foam pieces 302, according to one embodiment of the present subject matter. In various embodiments, the foam pieces are selected for their average size, and the selected group adheres to a selected standard deviation of size. FIG. 4 shows a pillow having a filling including small foam pieces, medium foam pieces, and large foam pieces, according to one embodiment of the present subject matter.

In various embodiments of the present subject matter a pillow is constructed having a mixture 402 of foam pieces. Various pillow embodiments include a case 404. Various embodiments additionally include a first plurality of foam pieces, such as the small foam pieces 302. Various embodiments include a second plurality of foam pieces. In some of these embodiments, the first plurality of foam pieces is larger on average than the second plurality of foam pieces. Some of these embodiments include medium foam pieces 202. Various embodiments of the present subject matter include a third plurality of foam pieces. In various embodiments, the third plurality of foam pieces is larger on average than the second plurality of foam pieces. Some of these embodiments include small foam pieces 302. In various embodiments the first, second, and third pluralities are disposed in the case in a mix 402. In some of these embodiments, the first plurality of foam pieces representing approximately 20 to 30 percent of the foam disposed in the case. In additional embodiments, the remaining 70 to 80 percent of the foam disposed in the case includes the second plurality and the third plurality in an approximately equal proportion.

In some of these embodiments, the case 404 includes printing on the exterior of the case. In some of these embodiments, the printing is lustrous. Lustrous printing includes silver colored paint in some embodiments. In some embodiments, the silver colored paint is flexible and resilient. For example, various embodiments of the present subject matter include printing which is adapted for use as a pillow. Use as a pillow includes compatibility with known washing machine cycles, in various embodiments. Hypoallergenic paint is used in some embodiments.

In some embodiments, the case 404 includes printing which is patterned. One pattern of the present subject matter includes a series of differently sized spots which follow generally concentric arcs. In various embodiments, the pattern includes a first series of concentric arcs which intersect with a second series of concentric arcs. Other patterns additionally fall within the scope of the present subject matter. Patterns of the present subject matter provide the benefit of camouflaging the hard edges of foam shapes contained in the case, in various embodiments. Camouflaged hard edges improve user satisfaction with feel and with pillow aesthetics, in various embodiments.

Various foams fall within the scope of the present subject matter. In some embodiments, foam selected for use in a cushion has a density of from about 1.8 pounds per cubic foot to about 1.9 pounds per cubic foot is used. In some embodiments, foam having an indent force deflection at 25% of from about 27 to about 35 is used. Foams having a compressive set percentage of approximately 10 percent are used in some embodiments. Some embodiments use foam having a tensile strength of approximately 10 pounds per square inch. Some embodiments use foam having a tear strength of approximately 1 pound per linear inch. Some embodiment use foam having an elongation percentage of 100 percent. Foams having other or additional mechanical properties also fall within the present specification. Foam properties are established using the ASTM D-3574-86 test method, in various embodiments.

One foam embodiment within the scope of the present subject matter is polyurethane foam. Various foam cell structures are used. For example, some embodiments use open cell foam. Some used closed cell foam. Combinations of closed cell foam and open cell foam may be used. In some embodiments, the foam in hypoallergenic. One variety of hypoallergenic foam is pretreated to remove gasses, in various embodiments.

In various embodiments, the case is hypoallergenic. Some embodiments include a hypoallergenic assembly of case and filling. Other pillow features not described herein may additionally be made hypoallergenic under the present scope.

Figure 5:
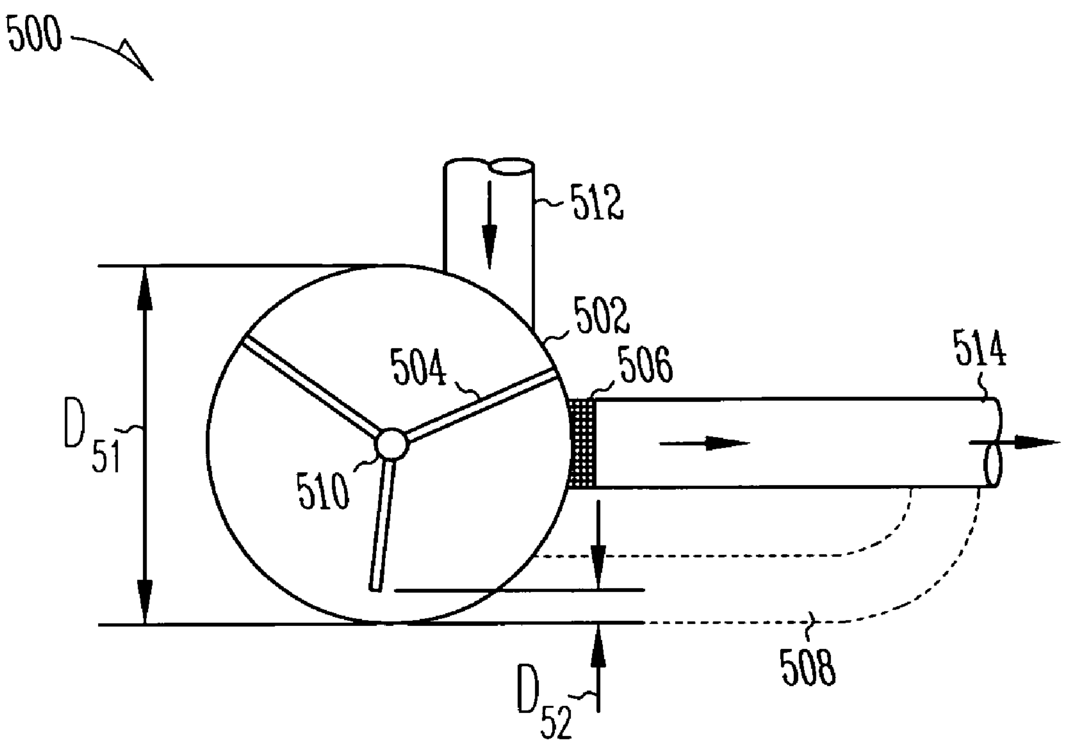
FIG. 5 shows a schematic of a side view of a tool for producing foam, according to one embodiment of the present subject matter.

FIG. 5 shows a schematic of a side view of a tool for producing foam, according to one embodiment of the present subject matter. In various embodiments, the tool includes a drum shaped chamber 502. Extending through the drum, substantially along the center axis of the drum, is a center shaft 510, in various embodiments. In various embodiments, one or more knives 504 are attached to the center shaft 510. Although three knives are pictured, more than one knives may be used. Although one center shaft 510 is pictured, a center shaft assembly may be used which includes hinged for multiple knives. Other assemblies and configurations are possible without departing from the present scope. In some embodiments, the knives 504 are attached to center shaft 510 with a chain. In additional embodiments, knives 504 are attached to center shaft 510 at hinged connections. Other mechanical connections additionally fall within the present scope.

The chamber has a diameter D51 of approximately 2 feet, in one embodiment. In various embodiments, the clearance D52 between the chamber 502 and the knives 504 is from about 0.375 inches to about 0.625 inches. In various embodiments, the knives 504 rotate inside the chamber 502 when they are spun with the center axis 510.

In various embodiments, material, such as foam, is fed into input 512. Material is cut by the knives 504, in various embodiments. In various embodiments, the center shaft rotates at between 1600 rotations per minutes and 2100 rotations per minutes. In some embodiments, the center shaft rotates at approximately 1780 rotations per minute. In some embodiments, the center shaft is powered with two 10 horsepower electric motors connected mechanically in parallel. In additional embodiments, one 40 horsepower electric motor is used. In some of these embodiments, the electric motors use approximately 100 amps. In some of these embodiments, the power is three phase. Additional speeds and power levels are possible without departing from the present scope.

In various embodiments, cut material is output through an outlet passage 514. In some embodiments, an interchangeable grid 506 is positioned in the outlet passage 514. In various embodiments, cut materials are collected using the grid 506. For example, in some embodiments, materials are processed with the center shaft 510 and the knives 504 until they pass through the grid 506, and onto a collection area such as a hopper.

Various embodiments of the present subject matter use a vacuum applied to outlet 514 to collect foam pieces. In some embodiments, a squirrel cage vacuum is positioned in outlet 514. In one embodiment, a squirrel cage vacuum is powered by center shaft 510. In some embodiments, foam pieces which exit grid 506 pass through the vacuum pump positioned in 514. Some embodiments include an optional feedback design 508 which can feed air back to chamber 502. A feedback design can be used to transmit foam pieces back to chamber 502, in various embodiments. A feedback design additionally can function as a pressure equalizing passage connecting outlet 514 to chamber 502, in various embodiments.

Various embodiments of the present subject matter include feeding a foam block into the tool 500. Some embodiments include cutting a foam block with the tool 500. Some embodiments include collecting a first plurality of foam pieces with an approximately 0.375 inch to an approximately 0.625 inch grid 506. In some of these embodiments, small foam pieces are produced. Small foam pieces 302 have an average thickness of one cell to approximately ten millimeters, in various embodiments. Various embodiments include collecting a second plurality of foam pieces with an approximately 0.75 inch to an approximately 1.25 inch grid 506. In some of these embodiments, medium foam pieces are produced. Medium foam pieces 202 have an average thickness of approximately 27 millimeters, in various embodiments. Various embodiments include collecting a third plurality of foam pieces with an approximately 2.0 inch to an approximately 2.5 inch grid 506. In some of these embodiments, large foam pieces are produced. Large foam pieces 102 have an average thickness of 46 millimeters, in various embodiments. Some embodiment include mixing the first, second, and third pluralities into the filling. Various embodiments include dispensing the filling into the case. In various embodiments, the size of the foam pieces is difficult to describe absolutely, as it changes from piece to piece due to the manufacturing processes used to produce the foam.

The tool 500 is just one apparatus capable of producing foam usable with the present subject matter. Processes described herein are useful for producing foam of the present subject matter, but are not exclusive of the possible processes which can be used for making pillows of the present subject matter. Other processes to make foam for pillows are possible. The present scope extends to pillows having foam pieces of various shapes, including foam pieces having irregular shapes, and regular shapes. Additionally, the present scope is not limited to foam pieces of a particular size, or a particular average size, and other sizes may be used within the present scope. Additionally, the mixing ratios for fillings of the present subject matter may be applied to a range of foam piece sized.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments, and various embodiments, will be apparent to those of skill in the art upon reviewing the above description. The scope of the present subject matter should be determined with reference to the appended claims, along with the full scope of equivalents to which such claims are entitled.

I claim:

1. An apparatus, comprising:

a case; and a plurality of polyurethane foam pieces disposed in the case, the plurality including a first plurality of foam pieces of a first average size, a second plurality of foam pieces of a second average size, and a third plurality of foam pieces of a third average size, with the first, second, and third average sizes being different, and with the first, second, and third pluralities of foam pieces disposed in the case in a mix, with the first plurality of foam pieces representing approximately 20 to 30 percent of the plurality of polyurethane foam pieces, and with the second plurality of foam pieces and the third plurality foam pieces constituting the remaining foam disposed in the case, in an approximately equal proportion by volume;

wherein the plurality of a polyurethane foam pieces has a density of from about 1.8 pounds per cubic foot to about 1.9 pounds per cubic foot, and an indent force deflection at 25% of from about 27 to about 35.

2. The apparatus of claim 1, wherein the plurality of foam pieces has a compressive set percentage of approximately 10 percent.

3. The apparatus of claim 2, wherein the plurality of foam pieces has a tensile strength of approximately 10 pounds per square inch.

4. The apparatus of claim 2, wherein the plurality of foam pieces has a tear strength of approximately 1 pound per linear inch.

5. The apparatus of claim 2, wherein the plurality of foam pieces has an elongation percentage of 100 percent.

6. The apparatus of claim 1, wherein the third plurality of foam pieces has an average thickness of 46 millimeters.

7. The apparatus of claim 1, wherein the second plurality of foam pieces has an average thickness of approximately 27 millimeters.

8. The apparatus of claim 1, wherein the first plurality has a thickness which ranges from the thickness of 1 cell to approximately 10 millimeters.

9. The apparatus of claim 1, made by the process comprising:

feeding a foam block into a cutting machine;

cutting the foam block with the cuffing machine;

collecting a first plurality of foam pieces using an approximately 0.375 inch to an approximately 0.625 inch grid;

collecting a second plurality of foam pieces using an approximately 0.75 inch to an approximately 1.25 inch grid;

collecting a third plurality of foam pieces using an approximately 2.0 inch to an approximately 2.5 inch grid;

mixing the first, second, and third pluralities into the filling; and dispensing the filling into the case.

10. The apparatus of claim 9, wherein the third plurality of foam pieces has an average thickness of 46 millimeters.

11. The apparatus of claim 9, wherein the second plurality of foam pieces has an average thickness of approximately 27 millimeters.

12. The apparatus of claim 9, wherein the filling includes polyurethane.

13. The apparatus of claim 12, wherein the foam includes open cells.

14. The apparatus of claim 13, wherein the first plurality of foam pieces has a thickness which ranges from the thickness of 1 cell to approximately 10 millimeters.

15. The apparatus of claim 1, wherein the case is at least partially covered with hypoallergenic paint.

16. The apparatus of claim 1, wherein the second plurality of foam pieces is larger on average than the first plurality of foam pieces; and the third plurality of foam pieces is larger on average than the second plurality of foam pieces.

17. The apparatus of claim 16, further comprising lustrous printing on the exterior of the case.

18. The apparatus of claim 17, wherein the lustrous printing include a pattern of spots.

19. The apparatus of claim 16, wherein the case is hypoallergenic.

20. The apparatus of claim 19, wherein the first, second, and third pluralities of foam pieces are hypoallergenic.

* * * * *